United States Patent [19]

Mansfield, Jr. et al.

[11] Patent Number: 5,306,580
[45] Date of Patent: Apr. 26, 1994

[54] ELECTROCHEMICAL CELL HAVING A COATED CUP-SHAPED TERMINAL

[75] Inventors: Robert N. Mansfield, Jr., Valley View; Robert F. Scarr, Westlake, both of Ohio

[73] Assignee: Eveready Battery Company, Inc., St. Louis, Mo.

[21] Appl. No.: 62,517

[22] Filed: May 17, 1993

Related U.S. Application Data

[63] Continuation-in-part of Ser. No. 848,497, Mar. 9, 1992.

[51] Int. Cl.$^5$ ............................................. H01M 2/04
[52] U.S. Cl. .................................... 429/175; 429/181; 427/405
[58] Field of Search .................... 429/27, 175, 181; 427/405; 29/623.5

[56] References Cited

U.S. PATENT DOCUMENTS 3,673,000  6/1972  Ruetschi ................... 429/175 X
4,557,983  12/1985  Sauer ........................... 429/27

FOREIGN PATENT DOCUMENTS 53-026932  3/1978  Japan ........................... 429/175
58-197656  11/1983  Japan ........................... 429/175
58-198852  11/1983  Japan ........................... 429/175

Primary Examiner—Stephen Kalafut
Attorney, Agent, or Firm—Robert W. Welsh

[57] ABSTRACT

A cell employing a cup-shaped terminal that has a concave surface coated by electrodeposition of a metal such that the deposited metal contacts the cell's anodic mixture so that the anodic mixture can be made with little or no mercury. A method for producing cup-shaped terminals with a metal electrodeposited on only one side is also disclosed.

20 Claims, 1 Drawing Sheet

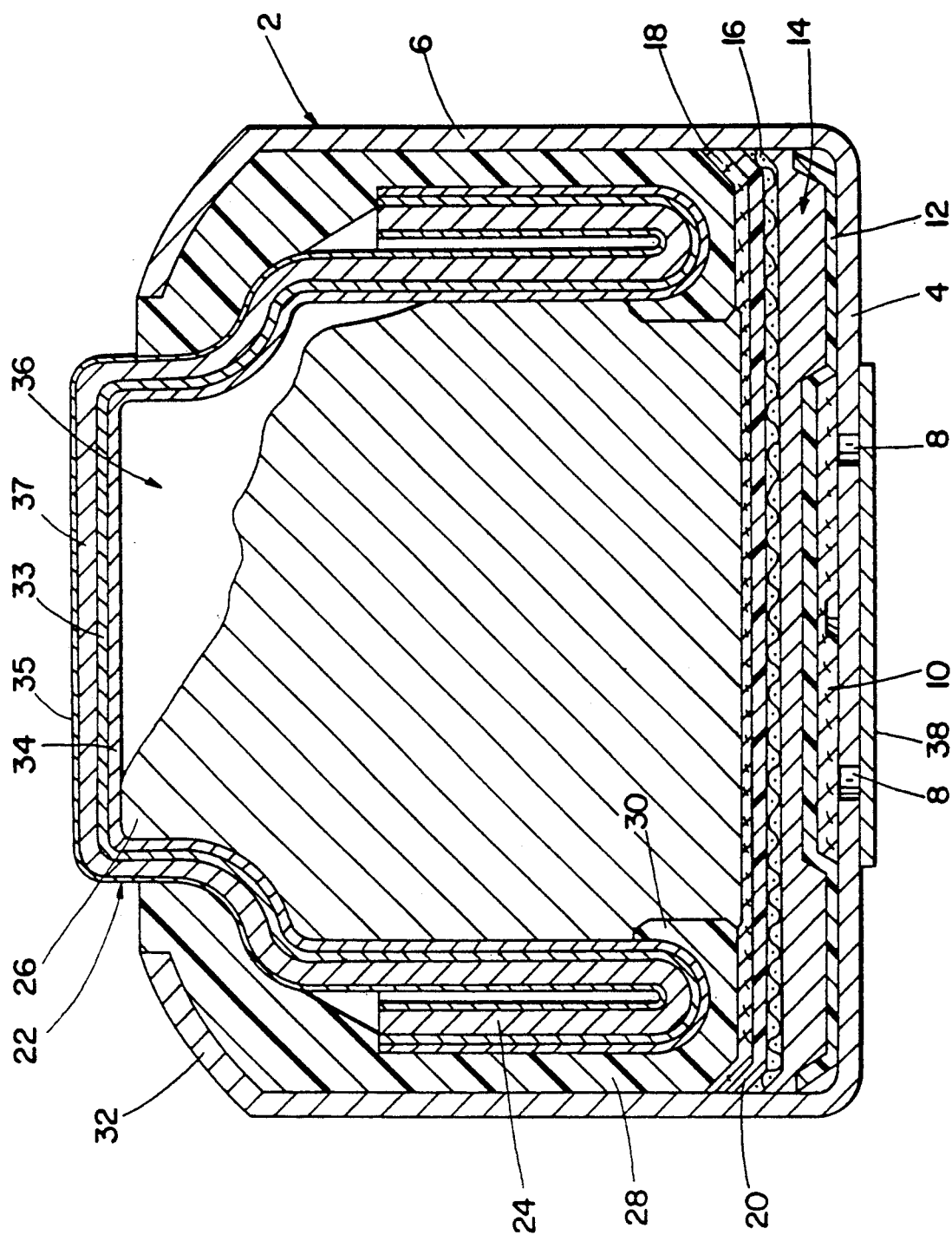

ELECTROCHEMICAL CELL HAVING A COATED CUP-SHAPED TERMINAL

CROSS-REFERENCE TO RELATED APPLICATION

The present application is a continuation-in-part of U.S. patent application Ser. No. 848,497, filed Mar. 9, 1992, the contents of which are incorporated herein.

FIELD OF THE INVENTION

The invention relates to a coated cup-shaped terminal in which the coated portion of the terminal contacts the zinc electrode of the cell and wherein the mercury normally employed in the zinc electrode is reduced to as low as zero percent.

BACKGROUND OF THE INVENTION

Manufacturers of alkaline batteries have invested substantial amounts of time and money in the effort to develop mercury-free batteries. The first batteries to incorporate mercury-free constructions were the AA, C and D standard alkaline batteries which are tubularly shaped such that the height of the battery greatly exceeds its diameter. These batteries have historically used the largest quantities of mercury per cell and are the most common sizes and types purchased by consumers. Therefore, removing mercury from these batteries was the best way to significantly reduce the quantity of mercury that is currently entering the general waste stream when used alkaline cells are thrown away.

In addition to developing mercury-free standard alkaline batteries, battery manufacturers have also sought to develop miniature battery constructions that are free of mercury. Miniature batteries are generally disc shaped such that the diameter of the batter is greater than the height of the battery. The anodes usually contain zinc powder and the cathodes may contain oxides of manganese, silver oxide, mercuric oxide, etc. While a layman may believe that the technology used to produce mercury-free standard alkaline batteries can be used to produce mercury-free miniature alkaline batteries, the manufacturers of miniature alkaline batteries have found that additional technology had to be developed before mercury-free miniature alkaline cells could be manufactured on a commercial basis.

Constructional differences between miniature alkaline batteries and standard alkaline batteries have forced battery manufacturers to develop processes and techniques that pertain to miniature cells. One of the key differences between standard alkaline batteries and miniature alkaline batteries is the shape of the collector. Standard alkaline batteries generally use an elongated or pin-shaped collector. The vast majority of the collector's surface is contained within and therefore exposed to the cell's electrolyte. One end of the collector usually protrudes slightly beyond the cell's interior in order to contact a separate part which serves as one of the battery's terminals. In contrast, miniature batteries typically use a generally disc shaped part that serves as both a collector and a terminal. This part, commonly referred to as an anode cup, must have one surface that can withstand exposure to the cell's caustic electrolyte and a second surface that can withstand exposure to the cell's external environment. Manufacturers of miniature alkaline cells have traditionally used multilayered anode cups in order to provide a part with two different surfaces. A substrate, such as steel, was generally coated on one side with nickel and on the opposite side was coated with a layer of copper. These multilayered anode cups have worked well for miniature alkaline cells that contain mercury in the anode mix. However, testing has shown that mercury free miniature alkaline cells that used the conventional multilayered anode cups generated excessive amounts of gas which lead to leakage of electrolyte. Therefore, there is a need for an anode cup that can be used in mercury-free miniature alkaline batteries.

Japanese unexamined application 01-307161 is directed to a mercury-free alkaline cell wherein the negative electrode's collector is coated with indium and/or lead which can be supplied by any method such as electroplating.

U.S. Pat. No. 4,500,614 discloses an alkaline cell having an anode prepared by amalgamating an alloy powder made of zinc and at least two metals selected from the group consisting of gallium, indium and thallium. The metals are incorporated in the cell to reduce the amount of mercury required to prevent corrosion of the zinc in an alkaline electrolyte which causes generation of hydrogen gas and subsequent leakage of the electrolyte.

German Patent 1,086,309 discloses an alkaline zinc cell in which an indium compound is added to the electrolyte and/or indium metal is alloyed with refined zinc so as to protect the zinc against corrosion in an acidic, neutral or alkaline electrolyte.

Japanese Publication No. 1958-3204, published Apr. 26, 1958, recites that the addition of 0.0001% to 2.0% indium can be added to pure zinc base alloy containing one, two, or more of the metallic elements Fe, Cd, Cr, Pb, Hg, Bi, Sb, Al, Ag, Mg, Si, Ni, Mn, etc., to form a zinc alloy which has a high corrosion resistance and which is suitable for use in primary cells.

It is an object of the present invention to provide a method for producing a coated cup-shaped terminal for housing a zinc-containing electrode of a miniature alkaline cell.

It is another object of the present invention to provide a miniature alkaline cell with a zinc-containing electrode that is substantially free or completely free of mercury and wherein the surface of the cup-shaped terminal contacting the zinc-containing electrode has an electrodeposited coating comprising an element, such as indium, and an overlayer which is free of indium.

These and other objects of the invention will be apparent from the following description.

SUMMARY OF THE INVENTION

The invention pertains to a process for producing a terminal for an electrochemical cell. The process comprises the steps of electrodepositing a layer comprising at least one element selected from the group consisting of In, Pb and Bi, onto only one side of a flat conductive substrate and then forming the substrate into a cup-shaped configuration defining a concave surface and a convex surface. The concave surface of the substrate comprises the electroplated layer.

Another aspect of the invention relates to an electrochemical cell comprising a first terminal contacting a first electrode material, a gasket located adjacent the first terminal, a separator contacting the first electrode material and a second terminal secured to the gasket. The second terminal comprises an electrically conductive substrate defining a convex surface and a concave surface. At least one element, deposited by electrodeposition and selected from the group consisting of indium, lead and bismuth, coats the second terminal's concave surface. The second terminal's convex surface remains free of indium, lead and bismuth. A second electrode material abuts the separator and the second terminal's concave surface thereby establishing a conductive path between the first terminal and second terminal.

The terminal's conductive substrate could be made of cold rolled steel, stainless steel, brass or other suitable metals. Stainless steel is preferred. The steel is commonly acquired in rolls of strip stock. The width of the strip is much greater than the thickness of the material so that the strip has two broad surfaces (i.e. faces) and two edge surfaces. The cross-sectional shape of the strip is preferably flat.

The chemical elements that are applied to one face of the conductive substrate include In, Bi and Pb. These elements are capable of reducing gas generation at the interior surface of the anode cup without interfering with the chemical reactions that enable the cell to produce an electrical current. Other elements, such as cadmium and mercury, perform similarly but are unacceptable for toxicologial reasons. The preferred element is indium. One or more of these elements is applied to just one face of the conductive substrate because the zinc in the cell contacts just one surface of the anode cup. The surface of the anode cup that forms one of the cell's exterior terminals is not exposed to the cell's caustic environment and should not be coated with In, Bi or Pb.

The preferred method of applying an element, such as In, to one surface of a conductive strip is electroplating. Electroplating indium onto one broad surface of flat laminated strip stock offers several advantages relative to other methods of depositing the indium. First, electrodepositing the indium onto the strip stock means that the uniformity of the plating thickness can be accurately controlled. This is particularly important since the configuration of a conventional terminal, such as an anode cup, would effectively prevent the uniform deposition of indium onto the concave surface of a cup-shaped terminal. Second, electroplating onto strip stock enables the manufacturer to accurately control the location of the indium. If cup shaped terminals were plated in a barrel plating operation, the indium would be plated onto both surfaces of the terminal. Selectively controlling the plating of the indium onto only one surface of the conductive substrate (i.e. strip stock) is important to battery manufacturers because the indium must not be allowed to contaminate the surface of the strip that will be exposed to the cell's external environment. Third, the preferred thickness of indium, which ranges from one microinch to approximately five microinches, can be readily obtained using an electrodeposition process. These quantities of indium generally cannot be attained by other conventional plating techniques, such as, relying upon indium ions in the electrolyte to plate onto the anode cup's surface. Fourth, in specific applications where a noncontinuous layer of indium is preferred, portions of the conductive substrate's surface should be made to directly contact the anode material. Since the quantity of indium electrodeposited onto the substrate can be accurately controlled, the discontinuous character of the indium layer can be achieved. A fifth advantage of the proposed invention is that the electrodeposition technique of this invention will work when chemical displacement of indium ions cannot be used. The chemical displacement process relies upon the presence of a reducing component, such as zinc, on the surface of the substrate. If the surface of the conductive substrate does not contain the reducing component, the indium cannot be deposited by chemical deposition.

Anode cups used by many manufacturers of miniature batteries are made from strip stock comprising two or more layers of metal. The multiple layered metal strip usually comprises a relatively thick component that serves as the conductive substrate. Thinner coatings of metal are deposited onto the surfaces of the thick component. The thick component must: (1) be an electrically conductive material that can be formed into thin flat strips and; (2) retain adequate mechanical integrity when formed into a cup-shaped configuration; and (3) accept an electrodeposited layer of In, Pb or Bi. The substrate is usually stainless steel. The surface of the steel that faces the interior portion of the cell is usually coated with a conductive metal such as copper, gold, silver, tin or alloys containing these metals. This coating is defined herein as the underlayer. In contrast to an exposed steel surface, this underlayer resists passivation and/or attack by the cell's electrolyte and provides a surface onto which the indium, lead or bismuth can be readily electroplated. Copper is the preferred material to use as the underlayer. The surface of the substrate located opposite the underlayer is commonly coated with a metal such as nickel or tin. This layer is defined herein as the overlayer. The overlayer must provide a decorative appearance and prevent rusting of the substrate's surface which would otherwise occur when the substrate is exposed to moisture in the air. The preferred material for use as the overlayer is nickel because of its bright appearance and adequate corrosion resistance.

The preferred process for manufacturing an anode cup of this invention is to coat one side of a steel strip with an overlayer material, such as nickel, coat the opposite side of the steel strip with an underlayer material, such as copper, and then deposit a metal, such as indium, onto only the exposed surface of the underlayer. This process forms a multilayered steel strip from which discs are punched. The discs may be processed through conventional metal forming equipment to form the anode cup with the underlayer and indium lining the concave portion of the cup and the overlayer protecting the convex portion of the cup. An anode cup manufactured by a process of this invention enables manufacturers of miniature alkaline batteries to construct cells that are free of added mercury.

A miniature cell of this invention is manufactured by inserting a zinc containing powder into the cavity defined by an anode cup of this invention and then combining the filled anode cup with a metal oxide containing cathode cup and an electrically nonconductive gasket to form a completed electrochemical cell. The gasket is usually made of plastic, such as nylon, and is located between the anode cup and the cathode cup. The gasket must electrically separate the anode cup from the cathode cup and prevent leakage of electrolyte from the cell.

BRIEF DESCRIPTION OF THE DRAWING

The sole figure shows the cross-sectional view of a miniature zinc-air cell employing an anode cup in accordance with this invention.

DETAILED DESCRIPTION OF THE DRAWING

As shown in the drawing, the largest component of the zinc-air cell is an open ended metal container 2 identified as a cathode cup. The cathode cup 2 (i.e. first terminal) is generally made from nickel plated steel that has been formed such that it has a relatively flat central region 4 which is continuous with and surrounded by an upstanding wall 6 of uniform height. Two small holes 8 are punched into the bottom 4 of cup 2 to act as air-entry ports. A layer of porous material 10 covers the interior surface of the air holes and acts as an air distribution membrane. A layer of polytetrafluoroethylene 12 covers the entire bottom of cathode cup 2 including the air distribution membrane 10. The second major component is an air electrode 14 which is positioned adjacent the polytetrafluoroethylene layer 12. This electrode 14 contains several components, including: a metal screen 16; a mixture of manganese oxides and carbon embedded in screen 16; a barrier film 18 which prevents the anode's electrolyte from moving into the cathode 14; and a soakup separator 20. The third component is a generally cup-shaped metal component 22 which forms the top of the cell and is generally referred to as the anode cup (i.e. second terminal). In the figure, the edge 24 of the anode cup has been rolled backward upon itself thereby creating a double wall. The anode cup 22 can be made from a trilaminate material comprising copper 33 that has been laminated to the bare side of a nickel-clad steel strip. A nickel layer 35 protects the exterior surface of steel strip 37 which is located between nickel layer 35 and copper layer 33. Other laminated materials from which anode cups may be made include: a bilaminate of copper on a stainless steel substrate or a laminate made from more than three layers. Round disks punched from this laminated metal strip are then formed into anode cups. The copper layer forms the inside surface of the anode cup and directly contacts the anodic mixture. The fourth component is the anodic mixture 26 which can comprise a mixture of zinc particles, electrolyte and organic compounds such as binders and corrosion inhibitors, which make up the battery's anode. A fifth component is a tubularly shaped ring or gasket 28 made from an elastomeric material. The bottom edge of the gasket 28 has been formed to create an inwardly facing lip 30 which abuts the rim of the anode cup 22. The cathode cup 2 along with the inserted air electrode 14 and associated membranes, are inverted over and pressed against the anode cup/gasket assembly which are preassembled. While inverted, the edge of the cathode cup 2 is collected inwardly. The rim 32 of the cathode cup is then compressed against the elastomeric gasket 28 between the cathode cup 2 and the anode cup 22 thereby forming a seal and an electrical barrier between the anode cup 22 and the cathode cup 2. A suitable tape 38 can be placed over the opening 8 until the cell is ready for use.

In accordance with this invention, a layer of indium 34 (shown exaggerated) is deposited on one side of the conductive substrate before it is formed into a cup 22. As shown in the drawing, the indium layer 34 forms the inner surface of cup 22 defining a cavity 36 into which the anodic mixture 26 is fed. As stated above, the indium layer could be a continuous layer or a discontinuous layer. Since the discontinuous nature of the indium layer is a microscopic feature which can only be seen with the aid of optical analytical equipment, the indium layer in the drawing is shown as continuous.

The following examples are provided to illustrate the concept of the invention and are not intended to limit the scope of the invention which is recited in the appended claims.

EXAMPLE 1

Several lots of miniature zinc-air cells were assembled in order to evaluate the impact of electroplating indium on the anode cup's interior surface. All cells measured approximately 0.455 inch in diameter by 0.210 inch high. These batteries are commonly referred to as "675 size". In the first of two tests, the control lot, designated lot A, has six percent mercury (Hg/Zn ratio) in the anode and the anode cup was not plated with indium. Lot B had no mercury in the anode and no indium plated onto the anode cup. Lots C through G has no mercury in the anode but the anode cups were plated with the following thicknesses of indium: lot C, one microinch; lot D, three microinches; lot E, fifteen microinches; lot F, thirty microinches; and lot G, fifty microinches. Each lot was separated into four sublots consisting of three cells each. All cells were then discharged continuously across a 625 ohm resistor to 0.9 volts. The first sublot was tested within a few days after the cells had been assembled. The second sublot was aged for one week at 71° C. and then tested. The third sublot was aged for twenty days at 60° C. prior to testing. The fourth sublot was aged for forty days at 60° C. and then put on test. The milliamphours of service to the designated cutoff are shown in Table 1. These data support the unexpected conclusion that all cells in sublots 1, 2 and 3 with indium plated anode cups but no mercury in the anode provided more service than comparably aged cells in lot A (6% Hg and no In) or lot B (no Hg and no In). A clear conclusion cannot be drawn from the cells which were aged for forty days at 60° C. (sublot number 4) because two of the five indium plated lots provided better service than the control while two other lots provided slightly less service and one lot had significantly less service. These inconsistent results are not unusual for cells tested at the relatively high temperature of 60° C. for forty days.

TABLE I

| Sub Lot | Cell Age | A 6% Hg/Zn (non-plated) | B (non-plated) | C 1 micro in | D Zero Hg Indium Plating Thickness 3 micro in | E 15 micro in | F 30 micro in | G 50 micro in |
| --- | --- | --- | --- | --- | --- | --- | --- | --- |
| 1 | initial | 494 | 477 | 533 | 533 | 520 | 516 | 516 |
| 2 | 1 wk at 71° C. | 494 | 461 | 532 | 533 | 511 | 517 | 504 |
| 3 | 20 days at 60° C. | 496 | 443 | 500 | 491 | 511 | 502 | 510 |
| 4 | 40 days at 60° C. | 491 | 461 | 504 | 487 | 480 | 504 | 423 |

Five cells from each of the lots and sublots were impedance tested after storage at 71° C. These data are shown in Table II. These data support the unexpected conclusion that mercury-free miniature zinc-air cells which contain indium-electroplated anode cups did provide significantly lower impedance values when compared to similarly aged cells containing no mercury and no indium, and comparable impedance when compared to cells containing six percent mercury and no indium.

TABLE II

| Cell Age | A 6% Hg/Zn (non-plated) | B (non-plated) | C 1 micro inch | D 3 micro inches | E 15 micro inches | F 30 micro inches | G 50 micro inches |
|---|---|---|---|---|---|---|---|
| | | | Zero Hg Indium Plating Thickness | | | | |
| initial | 6.3 | 7.5 | 6.9 | 7.7 | 5.4 | 5.6 | 5.3 |
| 2 weeks | 8.0 | 20.2 | 6.6 | 7.4 | 8.1 | 8.4 | 5.3 |
| 4 weeks | 8.9 | 35.0 | 9.8 | 9.7 | 9.5 | 10.3 | 8.8 |
| 6 weeks | 8.4 | 73.0 | 10.4 | 10.0 | 10.3 | 11.7 | 11.7 |
| 8 weeks | 9.0 | * | 10.2 | 11.4 | 12.7 | 14.1 | 13.1 |

*Test stopped due to cell leakage.

EXAMPLE 2

Referring to FIG. 3, several lots of miniature zinc-air cells were assembled in order to evaluate the impact of electroplating indium onto the interior surface of anode cups that were incorporated into cells which also contained 0.2 mg of In per gram of zinc in the anode mass. The indium was added to the zinc as indium hydroxide. As in Example 1, all batteries in this test measured approximately 0.455 inch in diameter by 0.210 inch high. The control lot in this Example, designated lot A, is identical to the control lot in Example 1. In other words, the cells contained six percent mercury, no indium electroplated on the anode cup and no indium hydroxide added to the anode. Lot H contained no mercury, no indium plated on the anode cup and 0.2 mg of In per gram of zinc in the anode mass. Lots I and J were identical to lot H except that their anode cups were electroplated with indium approximately one microinch thick and three microinches thick, respectively. Each lot was separated into four sublots consisting of three cells each. All cells were then discharged continuously across a 625 ohm resistor to 0.9 volts. The first sublot was tested within a few days after the cells had been assembled. The second, third and fourth sublots were aged for: one week at 71° C.; twenty days at 60° C. and forty days at 60° C. prior to testing. The milliamp-hours of service to the designated cutoff are shown in Table III. The data support the conclusion that all cells in sublots 1, 2 and 3 with indium plated anode cups and no mercury in the anode provided more service than comparably aged cells in lot A or lot H. A clear conclusion cannot be drawn from the cells which were aged for forty days at 60° C. because the cells from lot I provided less service than the cells from lot A while the cells from lot J provided more service than the cells from lot A. As was explained earlier, this type of anomaly in service data is not unusual when cells are stored for a relatively long time (i.e. forty days) at a relatively high temperature (60° C.).

TABLE III

| Sub Lot | Cell Age | A 6% Hg/Zn (non-plated) | I 1 micro in* | J 3 micro in* | H (non-plated)* |
|---|---|---|---|---|---|
| | | | Zero Hg Indium Plating Thickness | | |
| 1 | Initial | 494 | 514 | 544 | 507 |
| 2 | 1 wk at 71° C. | 494 | 515 | 526 | 480 |
| 3 | 20 Days at 60° C. | 496 | 510 | 510 | 483 |
| 4 | 40 Days at 60° C. | 491 | 485 | 523 | 455 |

*0.2 mg indium/gm zinc added as indium

Five cells from each of the lots and sublots in this Example 2 were impedance tested after storage at 71° C. These data are shown in Table IV. These data support the conclusion that mercury-free miniature alkaline zinc-air cells which contained indium hydroxide in the anode and indium-electroplated anode cups did provide lower impedance values when compared to both similarly aged cells containing no mercury, no indium electroplated onto the anode cup, but indium hydroxide in the anode, or cells containing six percent mercury and no indium at all.

TABLE IV

| Cell Age | A 6% Hg/Zn (non-plated) | I 1 micro inch* | J 3 micro inch* | H (non-plated) |
|---|---|---|---|---|
| | | Zero Hg Plating Thickness | | |
| Initial | 6.3 | 8.0 | 6.7 | 7.4 |
| 2 weeks | 8.0 | 7.1 | 7.3 | 10.6 |
| 4 weeks | 8.9 | 7.6 | 8.3 | 11.6 |
| 6 weeks | 8.4 | 7.4 | 8.5 | 16.5 |
| 8 weeks | 9.0 | 7.9 | 8.9 | 19.9 |

*0.2 mg indium/gm zinc added as indium hydroxide

The following conclusions can be deduced by comparing the service and impedance data in Example 1 and Example 2. First, the addition of 0.2 mg of In per gram of zinc to the anode mass of mercury-free miniature alkaline zinc-air cells which contain indium-electroplated anode cups did not significantly improve or detract from service performance on a 625 ohm continuous test. Second, the addition of 0.2 mg of In per gram of zinc to the anode mass of mercury-free miniature zinc-air cells which contain indium-electroplated anode cups did improve the impedance of cells stored at 71° C.

It is to be understood that modifications and changes to the preferred embodiment of the invention herein described can be made without departing from the spirit and scope of the invention.

We claim:

1. An electrochemical cell, comprising:
   a) a first terminal contacting a first electrode material;
   b) a gasket located adjacent said first terminal;
   c) a separator contacting said first electrode material, and
   d) a second terminal secured to said gasket and comprising an electrically conductive substrate defining a convex surface and a concave surface, said second terminal's concave surface coated by electrodeposition with a metal selected from the group consisting of indium, lead and bismuth, said second terminal's convex surface remaining free of indium, lead and bismuth, and said second terminal's coated concave surface contacting a second electrode material that abuts said separator.

2. An electrochemical cell, as recited in claim 1, further comprising an underlayer of metal between said second terminal's concave surface and the electrodeposited coating.

3. An electrochemical cell, as recited in claim 2, wherein said underlayer of metal is selected from the group consisting of copper, gold, silver and zinc.

4. An electrochemical cell, as recited in claim 1, wherein the thickness of the electrodeposited metal coating is between approximately 0.5 microinch and 50 microinches.

5. An electrochemical cell, as recited in claim 1, wherein said second terminal's conductive substrate is steel.

6. An electrochemical cell, as recited in claim 5, wherein said steel is cold rolled steel.

7. An electrochemical cell, as recited in claim 5, wherein said steel is stainless steel.

8. An electrochemical cell, as recited in claim 1, further comprising an overlayer of metal on said second terminal's convex surface.

9. An electrochemical cell, as recited in claim 8, wherein said overlayer of metal is selected from the group comprising nickel and tin.

10. An electrochemical cell, as recited in claim 1, wherein the second electrode material comprises zinc and is substantially free of mercury.

11. An electrochemical cell, as recited in claim 1, wherein the second electrode material comprises zinc and is completely free of mercury.

12. A process for producing a terminal for an electrochemical cell comprising the steps of:
    a) electroplating a layer comprising at least one element, selected from the group consisting of indium, lead and bismuth, onto only one side of a flat conductive substrate; and
    b) forming the substrate into a cup-shaped configuration wherein the side of the substrate comprising the electrodeposited layer defines the concave surface of the terminal.

13. A process for producing a terminal for an electrochemical cell, as recited in claim 12, wherein said substrate comprises an underlayer of metal deposited onto only one side of said substrate prior to electrodeposition of at least one metal selected from the group consisting of indium, lead and bismuth, onto the same side of the substrate thereby applying the underlayer between the substrate and electrodeposited layer.

14. A process for producing a terminal for an electrochemical cell, as recited in claim 13, wherein the underlayer is selected from the group consisting of copper, silver, gold and zinc.

15. A process for producing a terminal for an electrochemical cell, as recited in claim 12, wherein the thickness of the metal layer deposited onto one side of the substrate is between 0.5 microinch and 50 microinches.

16. A process for producing a terminal for an electrochemical cell, as recited in claim 12, wherein said substrate is steel.

17. A process for producing a terminal for an electrochemical cell, as recited in claim 16, wherein said steel is cold rolled steel.

18. A process for producing a terminal for an electrochemical cell, as recited in claim 16, wherein said steel is stainless steel.

19. A process for producing a terminal for an electrochemical cell, as recited in claim 12, further comprising the deposition of an overlayer onto the surface of the substrate located opposite the layer selected from the group consisting of indium, lead and bismuth.

20. A process for producing a terminal for an electrochemical cell, as recited in claim 19, wherein the overlayer comprises an element selected from the group consisting of nickel and tin.

* * * * *